Aug. 3, 1954    R. K. MAUD    2,685,214
STEERING WHEEL
Filed April 14, 1952
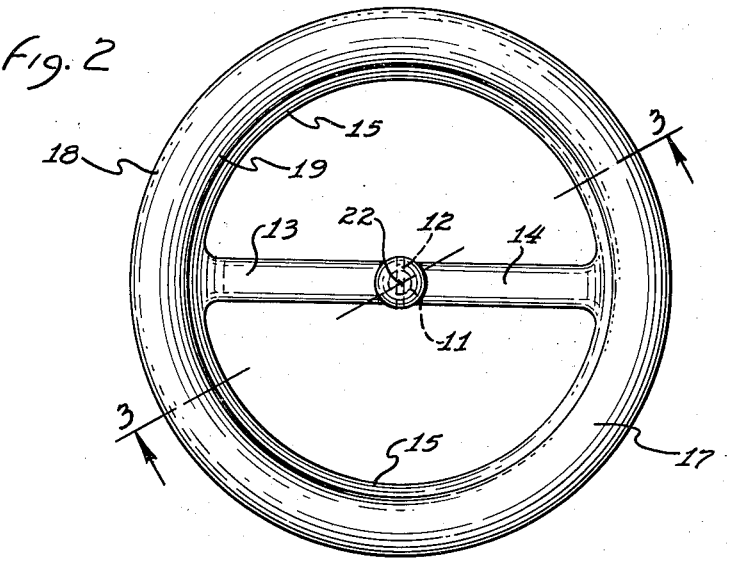
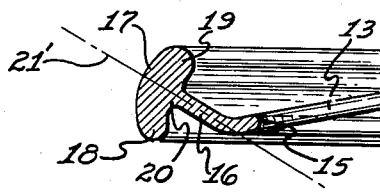
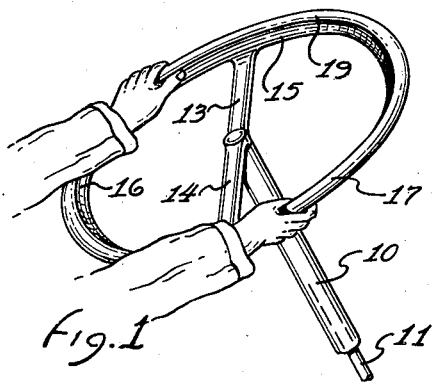
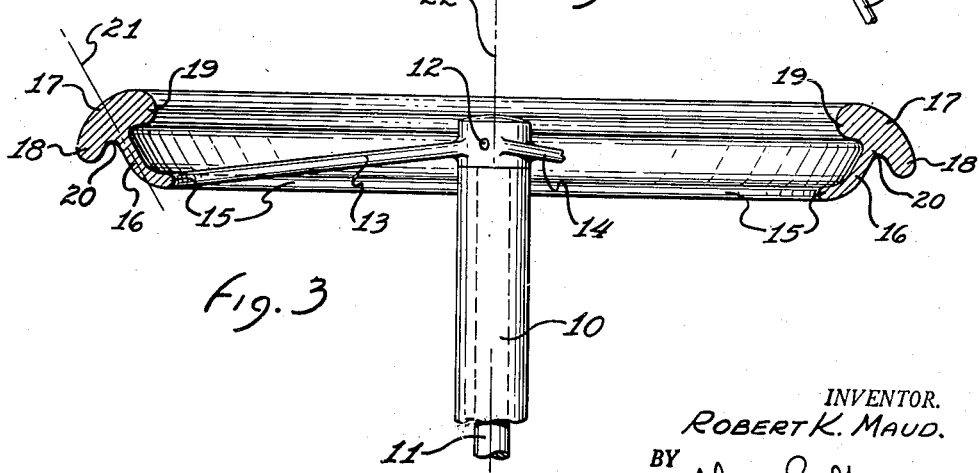
INVENTOR.
ROBERT K. MAUD.
BY
Willard S. Groen
ATTORNEY.

Patented Aug. 3, 1954

2,685,214

UNITED STATES PATENT OFFICE 2,685,214

STEERING WHEEL

Robert K. Maud, Phoenix, Ariz.

Application April 14, 1952, Serial No. 282,160

3 Claims. (Cl. 74—552)

This invention pertains to improvements in steering wheels and hand wheels and the like and is particularly directed to an improved wheel which prevents entanglement of the fingers of the operator with the spokes of the steering wheel.

Heretofore difficulty has been experienced, especially on heavy road vehicles and the like, with the spokes of the steering wheel becoming entangled with the fingers and thumb of the operator as the vehicle would hit ruts and obstructions in the road. Frequently the spokes would catch between the thumb and hand and bend back the thumb and cause serious injury and damage to the operator of the vehicle. Further, such action would cause loss of control, accidents and damage to the vehicle itself when lack of control thus resulted.

One of the objects of this invention is, therefore, to provide a steering wheel having a spoke structure connecting the wheel portion to a hub and an annular kidney shaped hand grip portion extending around the wheel and connected to the spoke portion by means of an annular thumb and finger engaging ring located underneath the kidney shaped hand grip portion.

Still another object of this invention is to provide an improved steering wheel structure having an annular spacing ring portion between the hand grip portion and the spokes of the wheel sufficient that the length of the fingers of the driver cannot engage their outer ends with the spokes of the wheel so that when the wheel should spin in the hand the spokes will not catch the fingers and cause injury or mishap in manipulating the vehicle.

Further features and advantages of this invention will appear from a detailed description of the drawings in which:

Fig. 1 is a perspective view of a steering wheel incorporating the features of this invention.

Fig. 2 is a plan view of the steering wheel shown in Fig. 1.

Fig. 3 is a section on the line 3—3 of Fig. 2.

Fig. 4 is an alternate structure on the line 3—3 of Fig. 2.

In Fig. 1 is shown one exemplary disclosure of a steering wheel mounted on a steering column 10 and connected to the steering rod or shaft 11 by any suitable means 12, the steering wheel consisting of spoke means such as the diametrically disposed spokes 13 and 14 which terminate at the base 15 of an annular finger protecting ring 16. The outer end of the annular ring 16 is connected to or formed integrally with kidney shaped hand grip portion 17 which may preferably have enlarged portion 18 for engagement of the fingers of the hand and another portion 19 about which the thumb may be gripped. It is important to note that the portion 16 between the spokes at 15 and its termination 20 with the kidney shaped portion 17 is of such extent that the thumb and fingers of the driver cannot reach down and be engaged by the spoke members 13 and 14 so that should the vehicle hit an obstruction and the wheel be knocked from the operator's hand and tend to spin there will be no danger of the operator's fingers and thumb getting entangled with the spokes 13 and 14 as the wheel is rapidly rotating out of control. Thus protection to the operator's hands and a better control of the vehicle is automatically obtained.

The angularity of the annular ring portion as defined by the minor axis indicated by the line 21 relative to the axis 22 of rotation of the steering wheel may be varied from a position with the line 21 substantially parallel to the axis 22 to a greatly inclined angle as at 21' in Fig. 4 if desired so as to give the most comfortable reaction and feel to the wheel to suit the operators.

The annular ring member 16 forms a cone or the like relative to the axis 22 of rotation of the steering wheel, said annular ring serving as a spacing member and protecting annular support for the steering wheel portion 17 of the wheel.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed as new and novel and desired to be obtained by United States Letters Patent is:

1. A steering wheel structure comprising spoke means, means for connecting inner portions of said spokes to a steering rod supported on a steering column of the vehicle, an annular conically disposed finger guard ring connected at the inner bore thereof to the outer ends of said spokes, and a kidney shaped hand gripping portion connected to the outer periphery of said annular ring with the major axis of said kidney shape substantially at right angles to said finger guard ring.

2. A steering wheel structure comprising a kidney shaped hand grip portion having its major axis lying in a cone converging toward the steering wheel axis above said wheel, an annular finger ring connected at right angles to the major axis of said kidney shaped hand grip portion, and spoke means connecting the inner edge of said annular ring portion to the steering rod of said vehicle so that said spokes are out of contact with the fingers of the operator gripping said hand grip portion.

3. A steering wheel structure including a plurality of spoke means, an annular ring member connected to the outer ends of said spoke means and lying in a cone converging downwardly relative to the axis of rotation of said steering wheel and a kidney shaped hand grip portion connected at one end of its minor axis to the outer edge of said annular ring located so that the fingers of the operator when gripping said hand grip portion are spaced from contact with the spokes of said steering wheel.

References Cited in the file of this patent

UNITED STATES PATENTS

| Number | Name | Date |
|---|---|---|
| 702,381 | Seddon | June 10, 1902 |
| 1,204,839 | Bartholomew | Nov. 14, 1916 |
| 1,826,278 | Flanigan | Aug. 14, 1928 |
| 1,872,052 | Wrigley | Aug. 16, 1932 |
| 2,144,000 | Seaman | Jan. 17, 1939 |

FOREIGN PATENTS

| Number | Country | Date |
|---|---|---|
| 23,175 of 1914 | Great Britain | Apr. 22, 1915 |
| 596,881 | France | Nov. 3, 1925 |
| 755,194 | France | Sept. 4, 1933 |